UNITED STATES PATENT OFFICE.

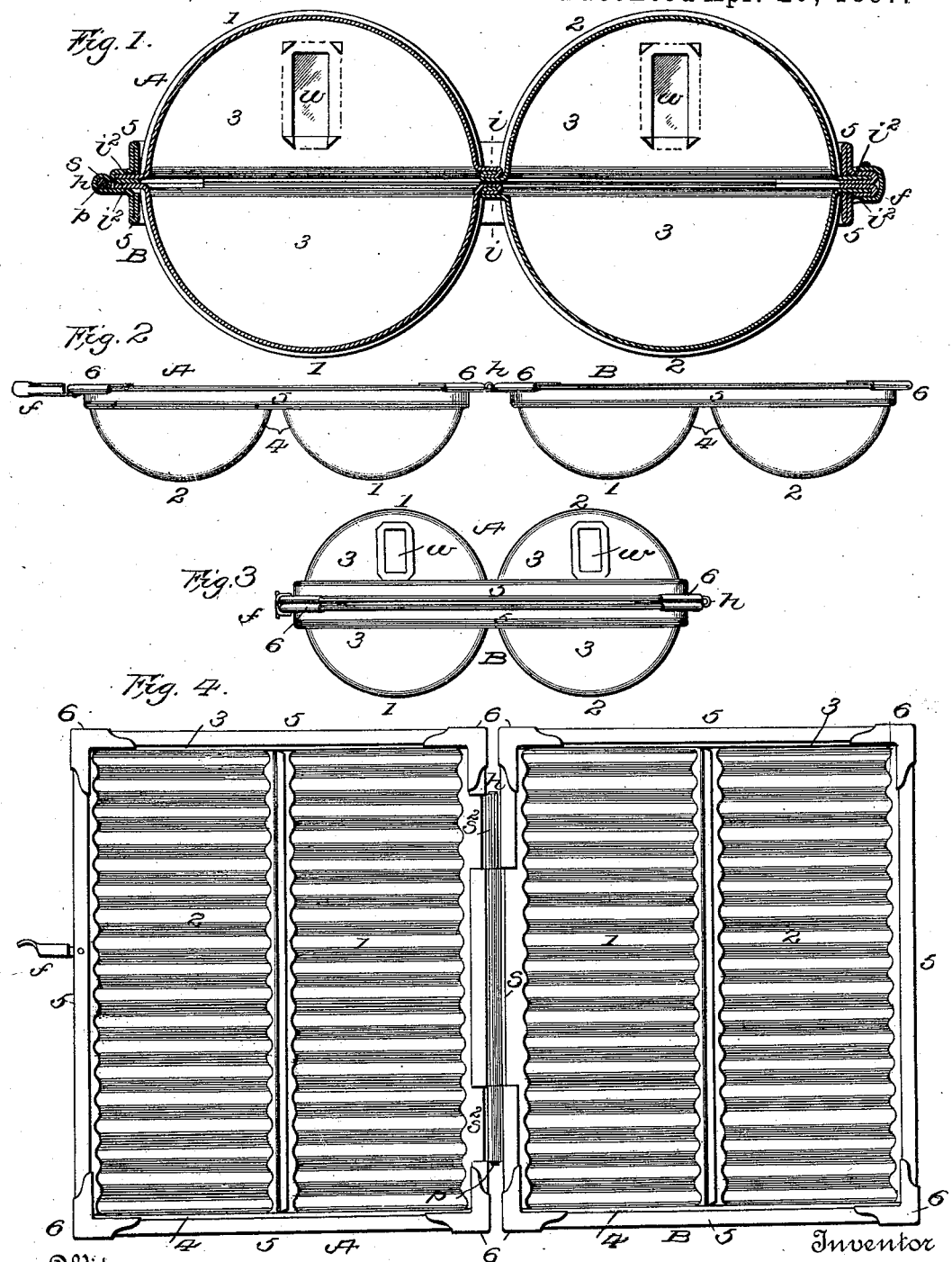

HERMAN HOLLANDT, OF BROOKLYN, NEW YORK, ASSIGNOR TO THE SILVER & COMPANY, OF SAME PLACE.

BAKING-PAN.

SPECIFICATION forming part of Letters Patent No. 581,232, dated April 20, 1897.

Application filed January 19, 1897. Serial No. 619,799. (No model.)

*To all whom it may concern:*

Be it known that I, HERMAN HOLLANDT, a citizen of the United States of America, and a resident of Brooklyn, in the State of New York, have invented a new and useful Improvement in Baking-Pans, of which the following is a specification.

This invention relates primarily to covered pans provided with inwardly-projecting ribs or corrugations for marking loaves of bread or cake, so as to facilitate slicing or subdividing them, but may be embodied in baking-pans of other kinds where two or more pans with or without covers are or may be advantageously united side by side, so as to be manipulated as one.

The present invention consists in a covered pan of peculiar construction, as hereinafter described and claimed, and in a novel combination of parts, which is the principal distinguishing characteristic of said pan. Its primary objects are to render the improved pan rigid, notwithstanding its duplex or multiple character, and at the same time light, as well as strong, and to furnish the closed pan with an outwardly-projecting thin rim at mid-height, which facilitates handling it; also, to facilitate fastening and unfastening the covered pan.

A sheet of drawings accompanies this specification as part thereof.

Figure 1 of the drawings is a cross-section of a duplex covered pan constructed according to this invention. Fig. 2 is a small-scale end view of the same pan opened. Fig. 3 is a like view showing the other end of the closed pan, and Fig. 4 is a top view projected from Fig. 2.

Like letters and numbers refer to like parts in all the figures.

The improved pan shown in the drawings is composed of two main parts A and B, permanently united with each other along one lateral edge of the closed pan by a hinge $h$ and held together in the closed pan at its opposite edge by a suitable fastening $f$.

The part A, which constitutes the cover of the closed pan, is provided at one end with mica windows $w$, Figs. 1 and 3, and the respective parts A and B differ in detail at the hinge $h$ and fastening $f$. Otherwise the two parts are identical in form and construction. Thus each of the said parts A and B comprises two pan portions 1 and 2, semicircular in cross-section, excepting interlocking flanges $i$ and $i^2$, together with end pieces 3 and 4 and a marginal frame 5, which incloses the pair of receptacles formed by said pan portions and end pieces. The semicircular bodies of the pan portions between their interlocking flanges are conveniently corrugated, as shown in the drawings, or otherwise molded, so as to correspondingly mold loaves baked in the pan, if desired.

The flanges $i$ of the pan portions 1 and 2 are interlocked with each other, and the outer flanges $i^2$ interlock the outer edges of the pan portions with the frame 5.

The end pieces 3 and 4 are united with the frame 5 in the same manner as by said flanges $i^2$, and each of said end pieces is common to both receptacles and is seamed to the adjoining ends of both pan portions.

Each member of the frame 5 is L-shaped in cross-section, its stiffening-flanges projecting in the same direction as the convexities of the pan portions, or, in other words, away from the joint between the parts A and B in the closed pan, having reference to rendering the pan rigid and practically unbreakable, especially at the point where the pan portions 1 and 2 are interlocked with each other. Said stiffening-flanges are furthermore located contiguous to the pan portions, so that the other and main flanges of the frame project outward and form a thin marginal rim, which facilitates grasping the pan and each of its main parts, and also to provide for the application thereto of said hinge $h$ and fastening $f$, as in the drawings.

Each of the four members of the frame 5 is composed of a single piece of sheet metal bent upon itself, as in Fig. 1, the horizontal bends receiving between them the outer flanges $i^2$ of the pan portions 1 and 2 and the corresponding flanges of the end pieces 3 and 4, and the four members of the frame are interlocked with each other in a known manner with the aid of superposed corner-pieces 6, so as to render its fastenings secure and the finish neat and free from cutting edges.

The hinge $h$ is conveniently formed by sleeve portions $s$ and $s^2$, cut from the adjoining members of the frame 5, together with a pintle-wire $p$, and the fastening $f$ is conveniently made in the form of a swinging porte-monnaie-clasp hinged to the horizontal flange of one of the frames 5 and embracing the outer edges of the rim-flanges, as in Fig. 1.

Each of the parts A and B may be made to include more than two pan portions in like manner, uncovered pans may be made identical with said parts individually, the pan portions 1 and 2 may be stamped with integral ends, so as to dispense with said end pieces 3 and 4, and other like modifications will suggest themselves to those skilled in the art.

As shown in the accompanying drawings and as above particularly described, the improved pan is designed to be made wholly of suitable tin-plate, excepting only the pintle-wire $p$ and the fastening $f$, which are of suitable iron.

Having thus described the said improvement, I claim as my invention and desire to patent under this specification—

1. A covered and duplex or multiple baking-pan composed of two similar parts united at one edge by a hinge and provided at the other edge with a suitable fastening, each of said parts comprising pan portions interlocked with each other, and a surrounding frame, the respective members of which are L-shaped in cross-section, interlocked with said pan portions, and serving to render the pan and each of its parts rigid and to provide the pan with thin rim-flanges, substantially as hereinbefore specified.

2. In a baking-pan, the combination of two or more pan portions interlocked with each other, and a surrounding frame interlocked with said pan portions and having stiffening-flanges which project in the same direction as the convexities of the pan portions and extend across the joint or joints between the pan portions, substantially as hereinbefore specified.

HERMAN HOLLANDT.

Witnesses:
W. H. SILVER,
W. B. WESTERVELT.